US009912203B2

(12) United States Patent
Lucchi

(10) Patent No.: US 9,912,203 B2
(45) Date of Patent: *Mar. 6, 2018

(54) AXIAL-FLUX ELECTRIC MACHINE WITH WINDING ROTOR AND METHOD FOR THE PRODUCTION THEREOF

(71) Applicant: LUCCHI R. ELETTROMECCANICA SRL, Rimini (IT)

(72) Inventor: Giorgio Lucchi, Rimini (IT)

(73) Assignee: LUCCHI R. ELETTROMECCANICA SRL, Rimini (IT)

(*) Notice: Subject to any disclaimer, the term of this patent is extended or adjusted under 35 U.S.C. 154(b) by 196 days.

This patent is subject to a terminal disclaimer.

(21) Appl. No.: 14/744,435

(22) Filed: Jun. 19, 2015

(65) Prior Publication Data

US 2015/0372545 A1    Dec. 24, 2015

(30) Foreign Application Priority Data

Jun. 20, 2014  (IT) .............................. RN2014A0024

(51) Int. Cl.
| | |
|---|---|
| *H02K 1/22* | (2006.01) |
| *H02K 1/24* | (2006.01) |
| *H02K 1/26* | (2006.01) |
| *H02K 3/28* | (2006.01) |
| *H02K 3/46* | (2006.01) |
| *H02K 15/02* | (2006.01) |
| *H02K 15/12* | (2006.01) |
| *H02K 16/04* | (2006.01) |
| *H02K 1/28* | (2006.01) |

(52) U.S. Cl.
CPC ................. *H02K 1/24* (2013.01); *H02K 1/28* (2013.01); *H02K 3/28* (2013.01); *H02K 3/46* (2013.01); *H02K 15/022* (2013.01); *H02K 16/04* (2013.01); *Y10T 29/49014* (2015.01)

(58) Field of Classification Search
CPC .. H02K 1/00; H02K 1/06; H02K 1/12; H02K 1/145; H02K 1/18; H02K 1/182
USPC ..... 310/112, 145, 154.01, 216, 216.008, 257
See application file for complete search history.

(56) References Cited

U.S. PATENT DOCUMENTS 9,673,675 B2 * 6/2017 Lucchi ..................... H02K 3/28
2006/0038456 A1 2/2006 Bojiuc
(Continued)

FOREIGN PATENT DOCUMENTS

JP    2009303378 A  * 12/2009

OTHER PUBLICATIONS

Machine translation of JP 2009303378 A.*

*Primary Examiner* — John K Kim
*Assistant Examiner* — Minki Chang
(74) *Attorney, Agent, or Firm* — Pearne & Gordon LLP

(57) ABSTRACT

An axial-flux electric machine with a winding rotor comprises a stator section and a rotor section, both developing around and axis. The rotor section comprises a rotor, which, in turn, comprises a toroidal rotor core made of a ferromagnetic material and a plurality of windings and of teeth, which are angularly distributed on the rotor core in an alternated configuration. The teeth have, on at least one lateral surface of theirs, a shaped profile defining at least one holding surface, which is such as to cooperate with a resin matrix, which is suited to steadily lock the teeth on the rotor core.

17 Claims, 8 Drawing Sheets

(56) References Cited

U.S. PATENT DOCUMENTS

| | | | |
|---|---|---|---|
| 2008/0164779 A1* | 7/2008 | Bojiuc | H02K 23/64 310/154.45 |
| 2010/0033043 A1* | 2/2010 | Seki | H02K 3/52 310/71 |
| 2010/0237822 A1* | 9/2010 | Hiramoto | H02K 21/046 318/718 |
| 2011/0037335 A1 | 2/2011 | Jang | |
| 2011/0221287 A1* | 9/2011 | Lucchi | H02K 3/24 310/54 |
| 2012/0161361 A1* | 6/2012 | Ghelardi | H02K 15/12 264/272.13 |
| 2012/0161554 A1* | 6/2012 | Ghelardi | H02K 5/20 310/54 |
| 2013/0285483 A1 | 10/2013 | Lee | |
| 2014/0042868 A1* | 2/2014 | Sullivan | H02K 1/278 310/261.1 |

\* cited by examiner

AXIAL-FLUX ELECTRIC MACHINE WITH WINDING ROTOR AND METHOD FOR THE PRODUCTION THEREOF

RELATED APPLICATION DATA

This application claims priority to Italy Patent Application No. RN2014A000024, filed on Jun. 20, 2014. All claims of priority to this application are hereby made, and the application is hereby incorporated in its entirety by reference.

FIELD OF INVENTION

The present invention relates to an axial-flux electric machine with winding rotor and to a method for the production thereof.

BACKGROUND OF THE INVENTION

Generally speaking, an electric machine comprises a stationary part, commonly referred to as "stator" (or "stator assembly"), and a mobile part, both equipped with windings of electrical conductor and/or sources of a magnetic and/or electromagnetic field. Together with the machine structure, these windings and sources always form both an electric circuit (defined as an assembly of structures and materials with an electric current and/or an electric field flowing through it) and a magnetic circuit (defined as an assembly of structures and materials with a magnetic field flowing through it). In order to operate, the electric machine uses electromagnetic induction (produced by the linkage of magnetic field fluxes with the electric windings) and/or electromagnetic forces (generated by the magnetic/electromagnetic field sources on the electric windings with current flowing through them and/or by the other magnetic/electromagnetic field sources). Some electric machines (for example, electric motors) can convert the electric current circulating in the electric windings into a movement of the mobile part relative to the stator. Other electric machines (for example, generators) can generate electric current and/or electrically driving forces in the electric windings using the motion of the mobile part relative to the stator. An electric machine of this kind can normally be used in both ways (that is, as a generator and as a motor). The windings can be made around a core of magnetic material in order to optimize the effect of the linkage of the magnetic flux with the electric windings themselves.

In one type of electric machine, the mobile part is a rotary member, also known as "rotor" (or "rotor assembly"). The axis of rotation of the rotor is particularly important and is usually used as the reference and/or symmetry axis for the structure of the electric machine. As the rotor moves relative to the stator, portions of the magnetic field sources and portions of the electric windings face each other at a given distance defining a gap between the rotor and the stator. There is a geometrical relationship between the axis of rotation of the rotor and the way in which the streamlines of the magnetic field, generated by the sources, are arranged in the gap between the stator and the rotor. Based on this geometrical relationship, machines of this kind can be divided into two categories: radial-flux electric machines and axial-flux electric machines. In a radial-flux electric machine, the arrangement of the magnetic field sources and of the electric windings, with which the magnetic field is linked, is such that, in the aforesaid gap between rotor and stator, the streamlines of the magnetic field can be approximated with segments stemming from straight lines that are perpendicular to the rotation axis of the rotor and are arranged in a radial manner relative to the rotation axis itself. In an axial-flux electric machine, the arrangement of the magnetic field sources and of the electric windings, with which the magnetic field is linked, is such that, in the aforesaid gap between rotor and stator, the streamlines of the magnetic field can be approximated with segments stemming from straight lines that are parallel to the rotation axis of the rotor.

Knowingly, axial-flux electric machines have a specific architecture, in which the windings and/or the stator and rotor permanent magnets are arranged on respective parallel discs, which are arranged close to one another and are separated by a gap, whose thickness extends in the direction of the rotation axis of the rotor. Therefore, this architecture is remarkably different from the one of radial-flux motors.

For this type of motors, two main architectures are known, the first one comprising a single rotor interposed between two fixed stator discs, the other one comprising a fixed stator disc interposed between to rotor discs. Other architectures are also possible, which, in particular, are obtained by combining - in a modular manner - a plurality of units of one specific architecture or the other, as described above. Generally, the rotor of axial-flux electric machines has permanent magnets, whereas the stator comprises a ferromagnetic core with a toroidal shape, on which coils are fitted, which link the rotor magnetic field.

In other cases, which are particularly interesting for the present invention, it is the stator that has permanent magnets, whereas the rotor comprises a ferromagnetic core with a toroidal shape, on which coils are fitted, which link the rotor magnetic field. In this case, the rotor is defined as a "winding rotor".

With reference to the case in which the rotor is a winding rotor, more in detail, the coils are alternated with the same number of teeth made of ferromagnetic material, which define the aforesaid gap relative to the stator and which, in cooperation with the ferromagnetic core, determine the rotor section of the streamlines. In other words, the teeth extend from the toroidal core parallel to the rotation axis of the rotor itself and, between them, the slots are defined, which house the coils.

A known solution to manufacture a winding rotor comprises, first of all, manufacturing the core of the rotor by joining a succession of punched metal sheets, which define the final outline of the body made of ferromagnetic material, which already has the teeth and the slots in between them. Subsequently, the coils are manufactured by hand-winding the copper conductor in the respective slots, thus completing the production of the winding rotor.

If, on the one hand, this system can grant to the rotor a remarkable mechanical resistance, we would like to point out that, on the other hand, the manufacturing process becomes more complicated, due to the manual operation needed to wind the coils.

This negatively and significantly affects the costs for the production of the electric machine.

Another solution to manufacture a toroidal core provided with windings comprises cutting in half a smooth ferromagnetic core, with a toroidal shape, in order to obtain to half-rings, so as to subsequently fit on each half-ring the coils that were manufactured before. However, this solution, which can be carried out in a simple and low-cost fashion (the coils can be obtained through simplified industrial procedures), does not use teeth made of ferromagnetic material. This leads to a first drawback concerning a high dispersion of the flux, which is not conveyed correctly, thus causing the machines to deliver insufficient performances.

SUMMARY OF THE INVENTION

In particular, the object of the present invention is to provide an axial-flux electric machine with a high-performance winding rotor, which has a high mechanical resistance and, at the same time, can be manufactured in a low-cost fashion.

Furthermore, the object of the present invention is to suggest a method to produce said electric machine with a winding rotor.

According to the present invention, there is provided an axial-flux electric machine with a winding rotor, which is characterised by the features set forth in the appended claims.

In particular, the axial-flux electric machine with a winding rotor according to the present invention comprises a rotor, which, in turn, comprises a toroidal core having a receiving portion and a plurality of teeth, which are initially separate from the core.

According to the invention, at least one of the teeth has, on at least one respective tangential surface facing the axis of the rotor or facing away from it, a shaped profile defining at least one holding surface, which faces away from the toroidal core; furthermore, the rotor comprises a resin matrix that coats and binds together the toroidal core and the teeth.

Preferably, said holding surface is substantially parallel to the receiving surface of the toroidal core.

Preferably, a plurality of teeth (more preferably, all teeth) have, on at least one of said tangential surfaces of the tooth, said shaped profile defining said at least one holding surface.

Preferably, said at least one tooth provided with the shaped profile has said shaped profile (defining said at least one holding surface) on both of its tangential surfaces.

Preferably, the rotor comprises an outer casing with an annular shape, which embraces the core and the teeth on the outside and is also coated with the resin matrix.

The resin matrix, by sticking to the core and to the holding surface of the tooth (or of all teeth, in the preferred configuration in which all teeth have at least one holding surface), after having hardened, steadily locks the tooth on the core, thus countering those mechanical stresses that, during use, tend to rip each tooth away from the core. There are no elements interposed between the teeth and the core, in particular there are no layers of glue or of other materials that could "contaminate" the magnetic circuit of the rotor. In particular, the teeth simply rest directly on the core and are subsequently locked in their position through the hardening of the resin.

Preferably, the holding surface is defined by a step. In an embodiment, the holding surface is defined by a projection of the tooth. In another embodiment, the holding surface is defined by a recess of the tooth. The holding surface is defined at least on one tangential surface of each tooth, facing the axis of the rotor, or on one tangential surface of each tooth, facing away from the axis of the rotor.

Preferably, the holding surface is defined on all teeth and, more preferably, on both tangential surfaces of the teeth mentioned above. In this way, each tooth can be supported by the resin independently of the other teeth.

Preferably, the casing has at least one locking portion, which can be engaged with said holding surfaces so as to keep the teeth pressed against the toroidal core. The locking portion can be defined by a groove or by a circumferential projection, respectively, if the holding surfaces, with which it is engaged, are defined by projections or recesses.

The teeth are angularly distributed around the axis so as to define a respective slot between two successive teeth. In an embodiment, each winding is at least partially housed inside a respective slot and it is fitted onto the toroidal core. In order to do so, the core is divided into at least two portions, preferably two half-rings.

In a different solution, each winding is fitted onto a respective tooth, which, in turn, is applied onto the receiving surface of the core. In this solution, the core can be made up of a single piece with a toroidal shape and there is no need to divide it into two or more parts.

Furthermore, each tooth has a base wall resting on the toroidal core and a top wall, which is opposite to the base wall and defines, in cooperation with a respective stator, a gap. In an embodiment, the top wall has an outer flat surface, which is parallel to said receiving surface of the toroidal core and laterally abuts on the corresponding top walls of the adjacent teeth. As a consequence, there is an electric and magnetic continuity of the teeth, with streamlines closing themselves on the end walls without passing through the stator.

In a different embodiment, the outer flat surface of each teeth is laterally spaced apart from the corresponding top walls of the adjacent teeth, so as to define a respective gap. This solution significantly reduces the flux that tends to close itself on the top walls of the teeth, but this configuration allows manufacturers to use a fixing ring made of a ferromagnetic material, which is placed on top of the top walls of the teeth and is rigidly connected to the top portions, so as establish an electric and magnetic continuity among the teeth.

In an embodiment, the toroidal core has two receiving surfaces with an annular shape, which are opposite to one another and substantially perpendicular to the axis of the rotor, each receiving a respective series of teeth and windings.

In a different embodiment, the core has one single receiving surface.

Furthermore, in an embodiment, the electric machine according to the present invention is an electric motor. In a different embodiment, the electric machine according to the present invention is an electric generator.

With reference to the method according to the present invention, during the rotor manufacturing step and prior to the rotor and stator assembling step, the rotor teeth are simply laid on the receiving surface of the toroidal rotor core and, subsequently, the core itself and the teeth and impregnated/coated with the resin matrix, so as to steadily lock the teeth together to the core.

Preferably, between the step of applying the teeth to the rotor core and the step of impregnating with a resin matrix there is interposed the step of securing the teeth to the rotor core (preferably by inserting the rotor core 2 and the teeth 4 applied thereto into a die that is configured in a suitable manner). This securing step is carried out even during at least part of the resin impregnation step.

The method also involves, before the impregnation step, the application—to the core—of a plurality of windings, which are impregnated with the resin, as well. When they are applied to the core, the windings are already finished.

In an embodiment, the windings are applied directly to the core prior to the application of the teeth, in particular they are fitted on the core and spaced apart from one another, so as to leave, between each pair of windings, a portion of the receiving surface free for the subsequent application of a tooth. For this reason, the core is initially divided into two parts, for example cut along two or more planes passing through the axis of the rotor, or, alternatively, one can provide different chunks of core, already manufactured according to an angular development that is smaller than a whole toroid.

In a different embodiment, the core initially is already available in a toroidal shape and it is not cut, whereas the application of the teeth onto the core and the application of the windings onto the core are carried out by fitting each winding onto a respective tooth and by subsequently applying the tooth onto the core, thus placing the base wall of the tooth on the receiving surface of the core.

Before the step of applying the teeth onto the core, or subsequent thereto, a step can be provided to mutually connect at least a sub-set of the teeth by fixing the top wall of the teeth to a fixing ring made of a ferromagnetic material.

BRIEF DESCRIPTION OF THE DRAWINGS

The invention is described in detail below with the help of the drawings, which show a merely explanatory and non-limiting embodiment thereof.

DETAILED DESCRIPTION OF THE INVENTION

Figure 1:
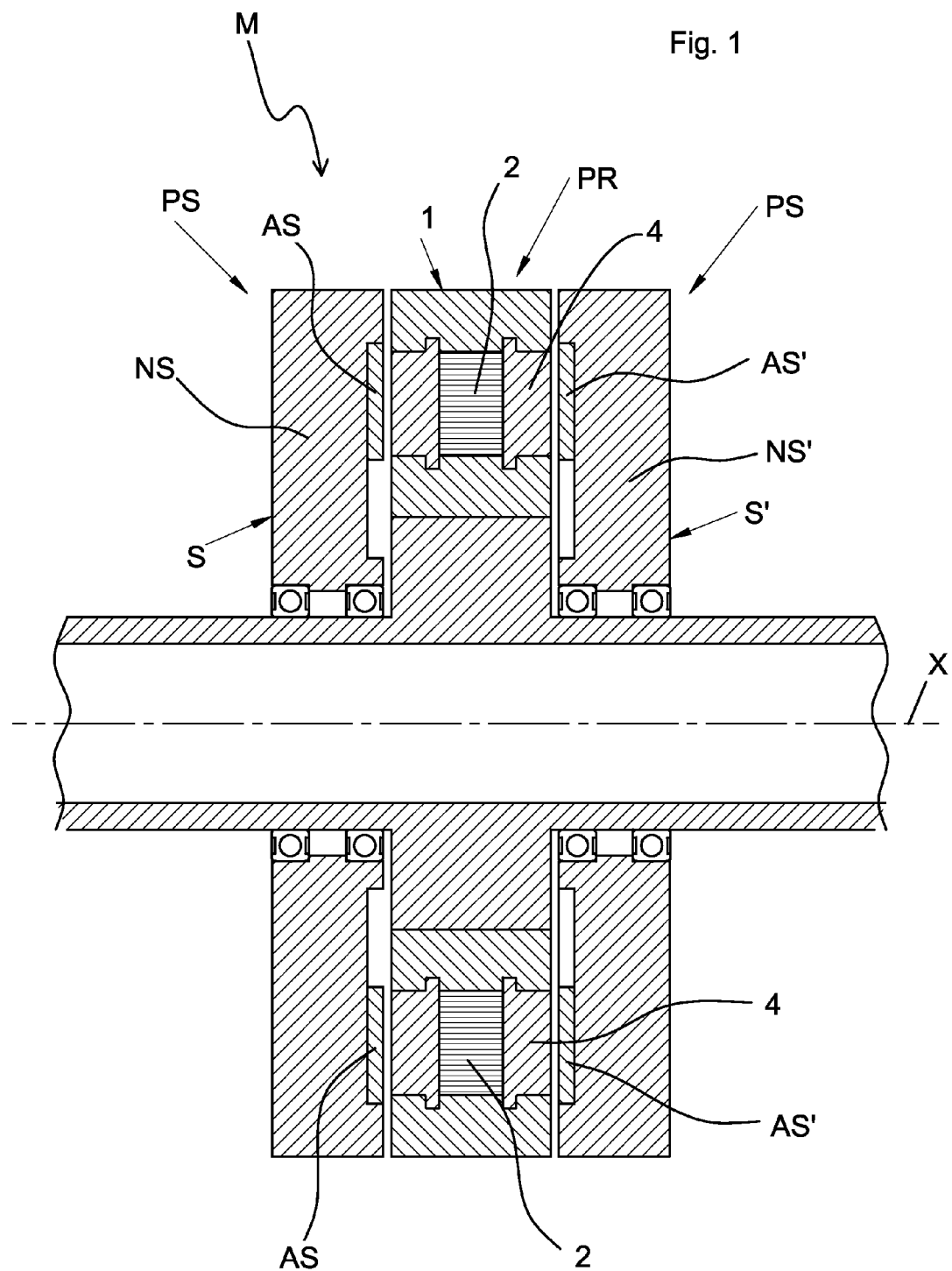
FIG. 1 is an overall schematic view of an axial-flux electric machine according to the present invention, shown in a cross-section in a plane containing the rotation axis X of the machine itself.

With reference to FIG. 1, M indicates, as a whole, an axial-flux electric machine according to the present invention, in an explanatory embodiment of its.

For the purpose of the present invention, the term "electric machine" can indifferently define both an electric motor and an electric generator.

The electric machine M comprises a stator section PS and a rotor section PR, both developing around a rotation axis X of the electric machine M.

The stator section comprises at least one stator S, S', which is provided with a relative core NS, NS' and with active elements AS, AS'. The active elements AS, AS' can be permanent magnets or electric windings, depending on the needs. The stator core NS, NS' develops with an annular shape around the axis X. The rotor section PR comprises a rotor 1, which also develops with an annular shape around the axis X. FIG. 1 shows, by way of non-limiting example, an electric machine M comprising a rotor 1 and two stators S, S' facing the rotor 1. The stator active elements AS, AS' were represented, again by mere way of example, as permanent magnets. Other configurations are evidently possible for the electric machine M (e.g. with more than one rotor 1 and one single stator S, S' or with different stators S, S' and rotors 1).

Figure 2:
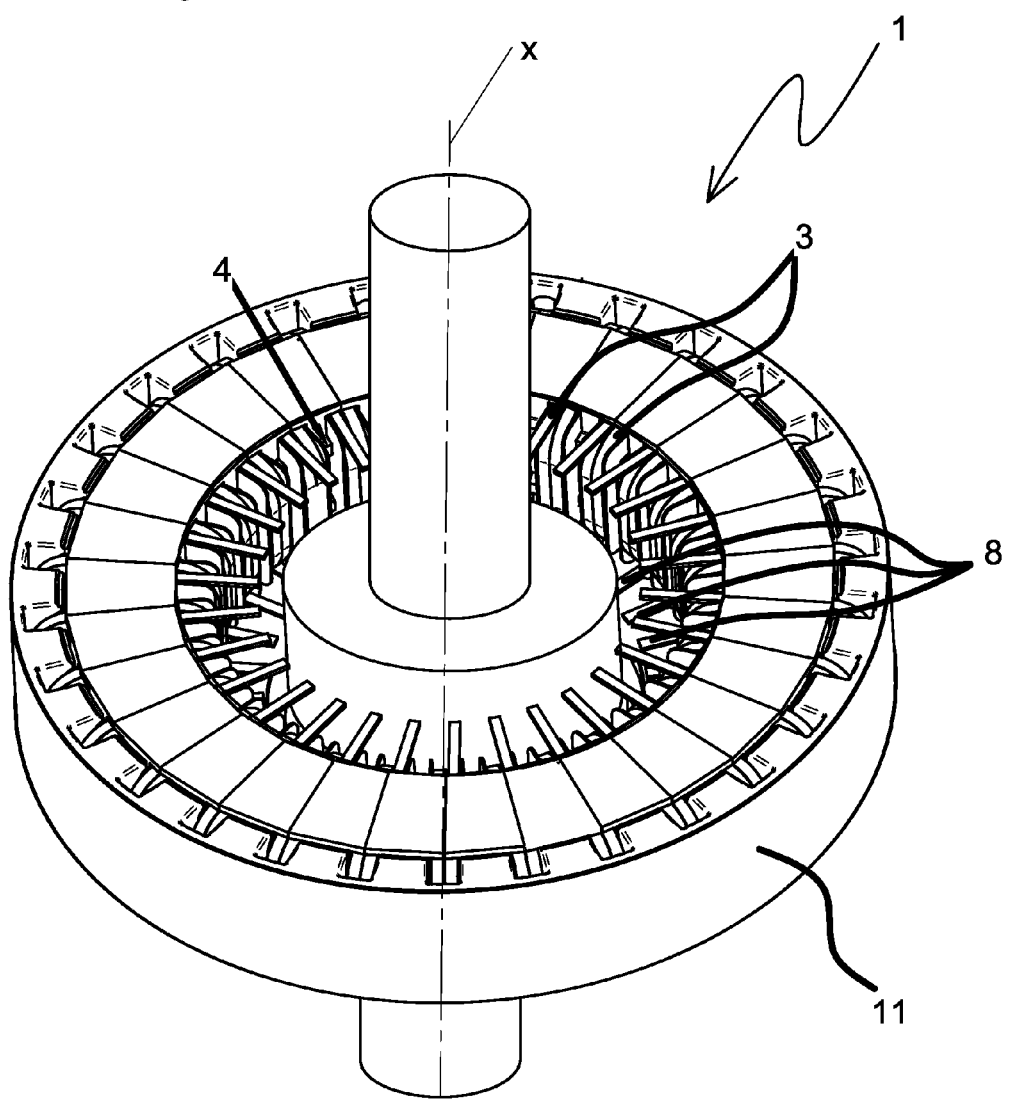
FIG. 2 shows the rotor of the axial-flux electric machine according to the present invention.
Figure 3:
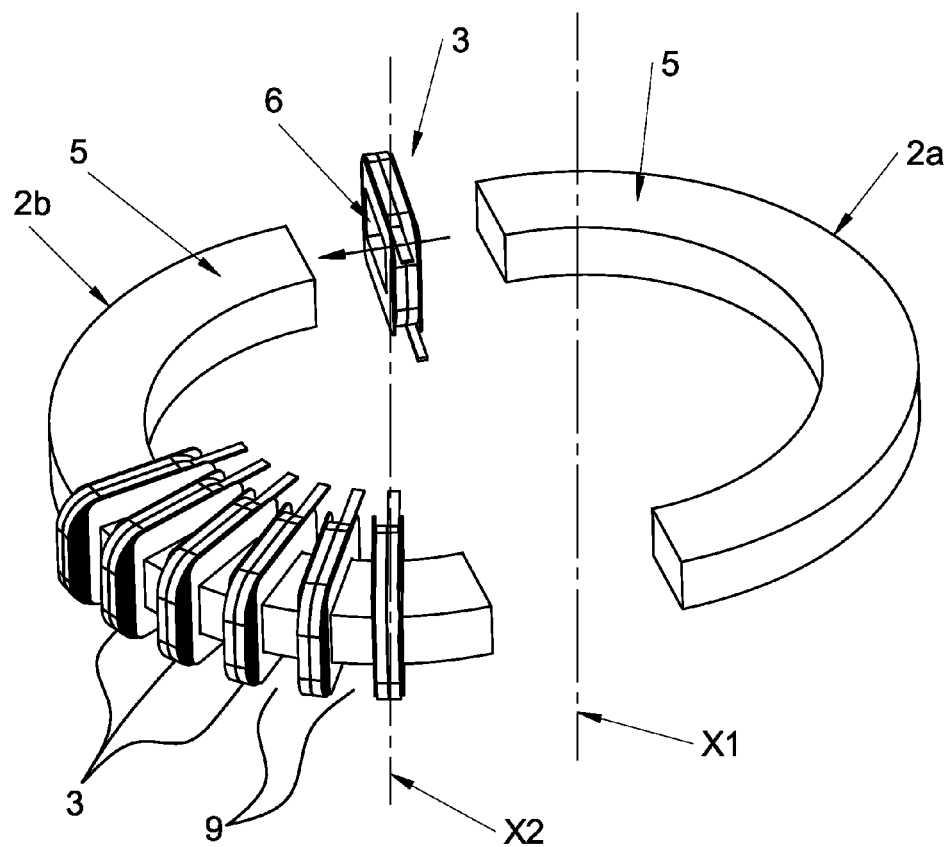
FIGS. 3 and 4 show two successive steps for the production of the rotor of FIG. 2.

With reference to FIG. 2, number 1 indicates, as a whole, a rotor for the axial-flux electric machine M according to the present invention, in a preferred embodiment.

The rotor 1 substantially consists of a toroidal rotor core 2 (more visible in FIG. 4) made of a ferromagnetic material, of a plurality of windings 3 or electric conductor coils, and of a plurality of teeth, which are made of a ferromagnetic material, as well. The toroidal rotor core 2 develops along a circular line around the rotation axis X of the electric machine M. The rotor core 2 has, furthermore, at least one receiving surface 5 with an annular shape, which also develops around the axis X. Preferably, the receiving surface 5 is flat and perpendicular to the axis X. More preferably, the receiving surface 5 is smooth. In a preferred embodiment, as shown in the figures, the rotor core 2 has two receiving surfaces 5 with an annular shape, which are opposite to one another.

On the rotor core 2 there are arranged the windings 3, which, more precisely, are fitted onto the rotor core 2. In other words, each winding 3 is obtained by creating a plurality of parallel turns in a metal conductor, so as to define a final structure with an annular shape. Furthermore, each winding 3 has an insulating support 7, around which the loops are arranged and which defines a central opening 6, which is substantially complementary to the cross section of the toroidal rotor core 2. In order to allow the windings—which were previously prepared—to be fitted, the toroidal rotor core 2 is divided into two preferably identical half-rings 2a, 2b, each developing on a circular line around a respective axis X1, X2 for a partial development of said line. The two half-rings 2a, 2b allow the toroidal rotor core 2 to be put back together after the windings 3 have been inserted. Each winding 3 has, furthermore, a pair of connection terminals 8, so that, when the rotor 1 is ready, the windings 3 can be connected in a desired manner to a terminal board (for example, to supply power to a load rotating with the rotor 1) or to a series of sliding contacts or brushes or the like, depending on the needs.

The windings 3, therefore, are fitted onto the rotor core 2 so that the loops are linked with the circular development line of the rotor core 2, thus they are linked with the magnetic flux flowing through the core 2 (and through the teeth 4, as explained more in detail below). In other words, the windings 3 have loops that are arranged according to a substantially radial direction, namely substantially passing through the axis X of the toroidal rotor core 2. The windings 3 are placed on the rotor core 2 according to an equally spaced apart arrangement around the axis X and define, between one another, respective seats 9 for the insertion of the teeth 4. The teeth 4 are alternated with the windings 3 and are applied to the receiving surfaces 5 of the rotor core 2.

Figure 5:
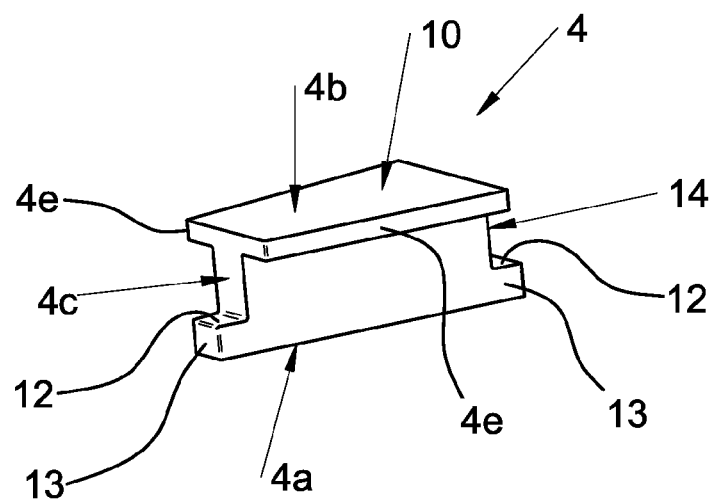
FIGS. 5 and 6 show two different views of a detail (tooth) of the rotor of FIG. 2.
Figure 6:
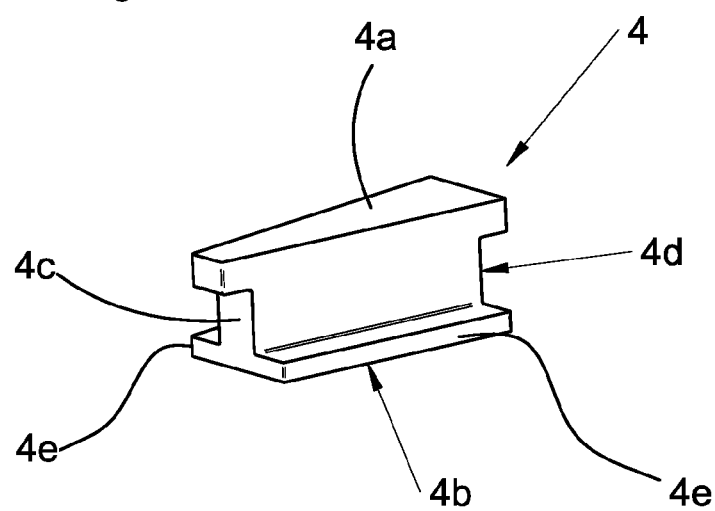

More in detail, as shown in FIGS. 5 and 6, each tooth 4 has:
- a base wall 4a, which is suited to rest on the receiving surface 5 of the rotor core 2;
- a top wall 4b, which is opposite to the base wall 4a;
- a first and a second tangential wall 4c, 4d, namely an inner one (facing the axis X) and an outer one (opposite to the inner one), which are comprised between the aforesaid base wall 4a and top wall 4b.

The teeth 4 are manufactured, for example, through sintering or they are obtained form laminate materials. In any case, the teeth 4 have ferromagnetic properties. The top wall 4b has an outer flat surface 10, which is parallel to the receiving surface 5 of the rotor core 2 and is suited to face the gap defined in cooperation with the stator S, S'. The teeth 4 are arranged on the receiving surface 5 of the rotor core 2, so as to cause the base wall 4a to rest on it, and extend away from the receiving surface 5 along the axis X. In particular, the aforesaid plurality of teeth 4 is divided into a first and a second series of teeth, which are applied to a first receiving surface 5 and to the other receiving surface 5, respectively, and extend away from the respective receiving surface 5 along the axis X.

Preferably, the rotor 1 comprises, furthermore, an outer casing 11 with an annular shape, which is shaped so as to embrace the outer periphery of the rotor core 2 and of the teeth 4, in particular the second tangential surfaces 4d of the teeth 4, so as to compact the overall structure of the rotor 1.

Advantageously, at least one of the teeth 4, preferably a sub-set of the aforesaid plurality of teeth 4 and, more preferably, each one of the teeth 4, has, on at least one of the tangential surfaces 4c, 4d, a shaped profile defining at least one holding surface 12, which is substantially parallel to the receiving surface 5 of the toroidal rotor core 2 and faces away from the toroidal rotor core 2, when the teeth 4 is applied to the core 2. Preferably, the holding surface 12 is defined by a step, which is preferably right, namely consisting of two perpendicular surfaces, in particular a first surface parallel to the tangential surface 4c, 4d and a second surface parallel to the receiving surface 5. In an embodiment shown in FIGS. 5 and 6, the holding surface 12 is defined by a projection protruding from the aforesaid tangential surface 4c, 4d. However, in a different embodiment, the holding surface 12 can also be defined by a cavity or a recess made on the tangential surface 4c, 4d. This solution is shown, by way of example, in FIG. 8 in combination with another feature, which will be discussed more in detail below.

Preferably, the holding surface 12 is defined both on the first and on the second tangential surface 4a, 4b, in accordance with FIGS. 2-6. However, according to an embodiment that is not shown herein, the holding surface 12 could be defined only on the first or on the second tangential surface 4a, 4b.

Advantageously, at least one rotor core 2 and the teeth 4 and, preferably, even the casing 11 are impregnated by means of a resin matrix 15, which stabilizes the different components of the stator 1 in a stable position. The resin, by sticking to the holding surfaces 12, steadily locks the teeth 4 relative to the rotor core 2. This allows the teeth 4 to be initially applied to the rotor core 2 by simply laying the base wall 4a of the teeth 4 on the receiving surface 5, without using adhesive substances that might jeopardize the overall reluctance of the rotor magnetic circuit. Preferably, the resin is applied by means of injection or through casting into a mould.

Figure 7:
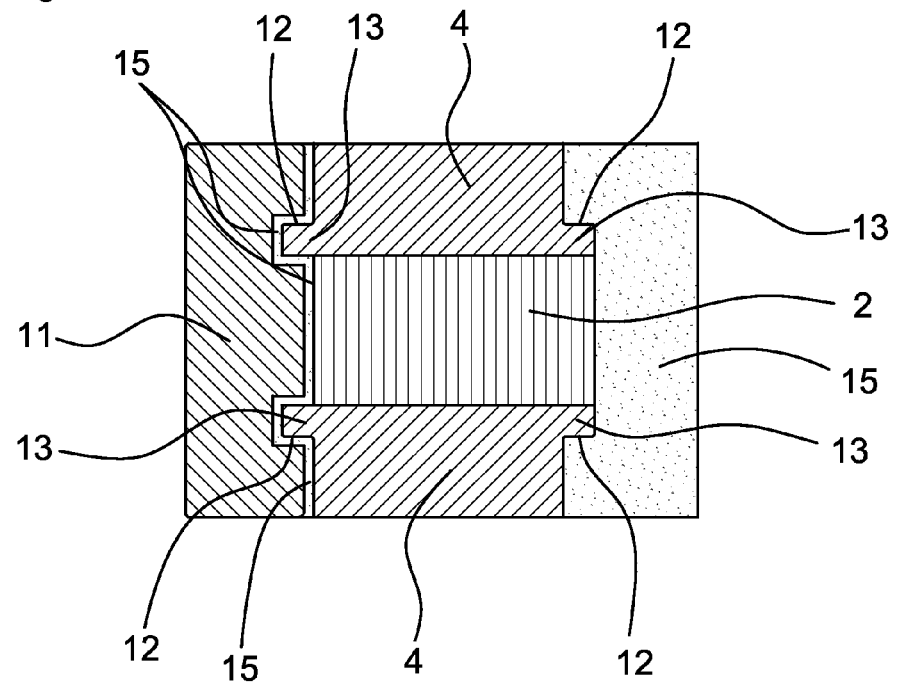
FIG. 7 shows the rotor of FIG. 2 in a cross-sectional view along a plane containing the axis X of FIGS. 1 and 2 and intersecting the tooth of FIGS. 5 and 6.
Figure 8:
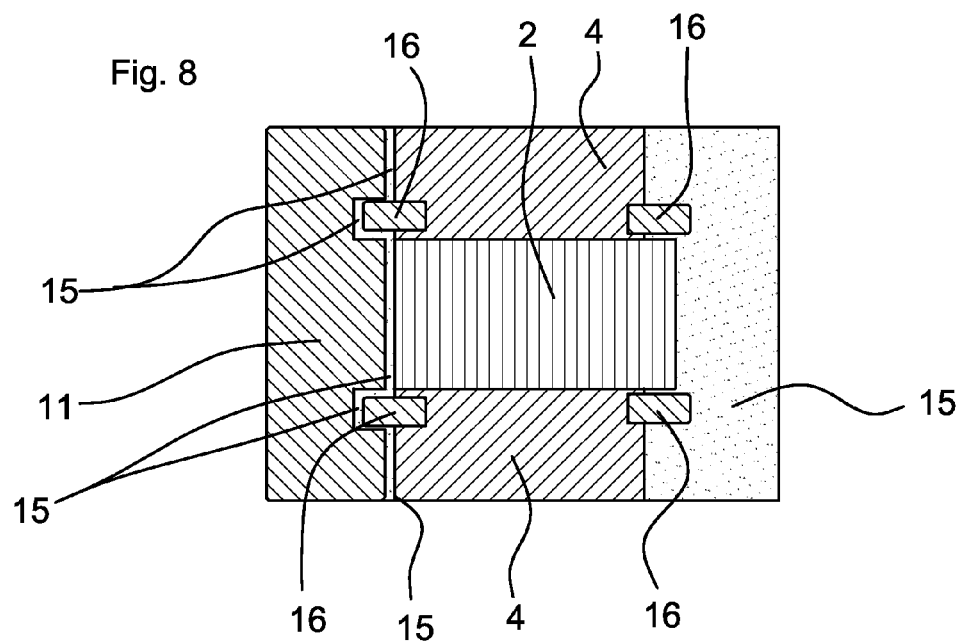
FIG. 8 shows the rotor of FIG. 7 according to a variant.

Preferably, the casing 11 has at least one locking portion (not shown), which can be engaged with the holding surfaces 12 obtained on the second tangential surface 4d of the teeth 4. Preferably, in this configuration, the locking portion extends in a circumferential manner along an entire angular length developing around the axis X and can be engaged with the holding surfaces 12 of the teeth 4 so as to keep the teeth 4 pressed against the receiving portion 5 of the toroidal rotor core 2. In case the holding surfaces 12 are available on the second tangential surface 4d of the teeth 4 and are defined by projections 13 (FIGS. 5 to 7), the locking portion of the casing 1 can be advantageously defined by a groove, which extends along the entire circumferential development of the casing 1 and can house the projections 13 of the teeth 4 (FIG. 7). On the other hand, in case the holding surfaces 12 are available on the second tangential surface 4d of the teeth 4 and are defined by cavities or recesses, the locking portion can be advantageously defined by a projection, which extends along the entire circumferential development of the casing 1 and can be inserted into the cavities or recesses of the teeth (according to a variant that is not shown herein); as an alternative to said projection defined by the casing, the locking portion can be made up of pins 16 (for example made of steel), which are inserted between said cavities or recesses of the teeth 4 and a corresponding groove defined in the casing 1 (this embodiment is shown in FIG. 8). In both cases, the casing 11 keeps the teeth 4 packed on the rotor core 2, thus helping the locking effect exerted by the resin matrix.

The resin usually is an epoxy resin with insulating features, preferably with mechanical and/or heat conductivity properties.

Figure 4:
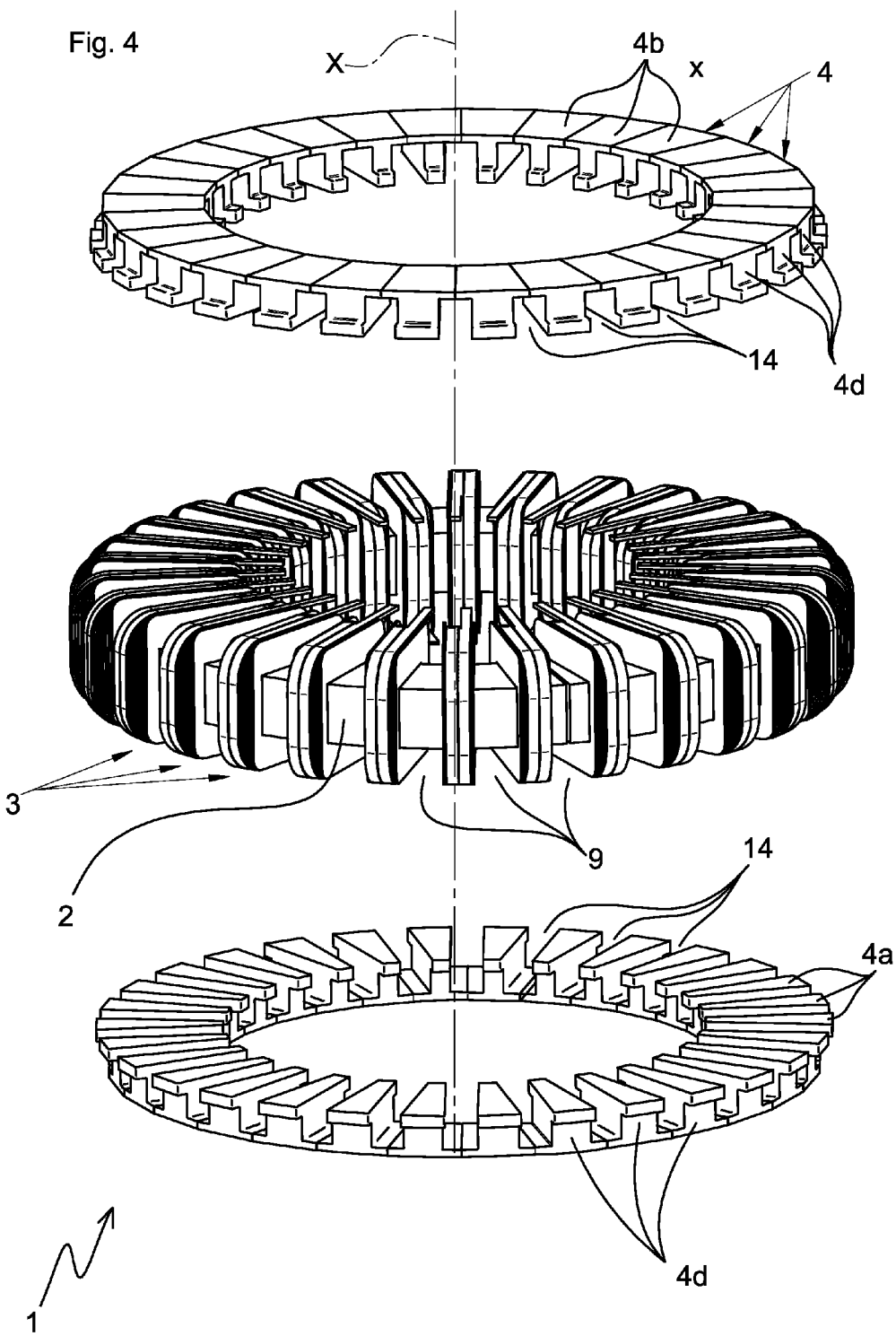

As already mentioned above, the windings 3 are placed on the rotor core 2 according to an equally spaced apart arrangement around the axis X and define, between one another, respective seats 9 for the insertion of the teeth 4. As shown in FIG. 4, the teeth 4, as well, are placed on the rotor core 2 according to an equally spaced apart arrangement around the axis X and define, between two successive teeth 4, a respective slot 14 to house a respective winding 3.

As shown in FIGS. 3-6, the top wall 4b of each tooth 4 has a larger cross section compared to the remaining part of the tooth 4 (in particular, compared to the central part defining the tangential surfaces 4c, 4d), so as to create a tooth 4 with the shape of a "mushroom".

Preferably, when the teeth 4 are applied to the rotor core 2, the top wall 4b laterally abuts on the corresponding top walls 4b of the adjacent teeth 4. In other words, the top walls 4b of the teeth 4 have lateral edges 4e that converge towards the axis X (thus giving to the outer flat surface a substantially trapezoidal shape) and are suited to come into contact with corresponding lateral edges 4e of the adjacent teeth 4.

Preferably, after having applied the casing 11, the latter presses the teeth 4 towards the axis X, thus causing the mutual locking of the top walls 4b of the teeth 4. In this locked configuration, the slots 14 are closed (on the lower side by the rotor core 2, laterally and on the upper side by the teeth 4) and, therefore, they permit a dispersed flux that does not leave the rotor and, thus, does not interact with the stator to generate a mechanical power. This configuration turns out to be especially useful to carry out the defluxing of the electric machine.

Figure 9:
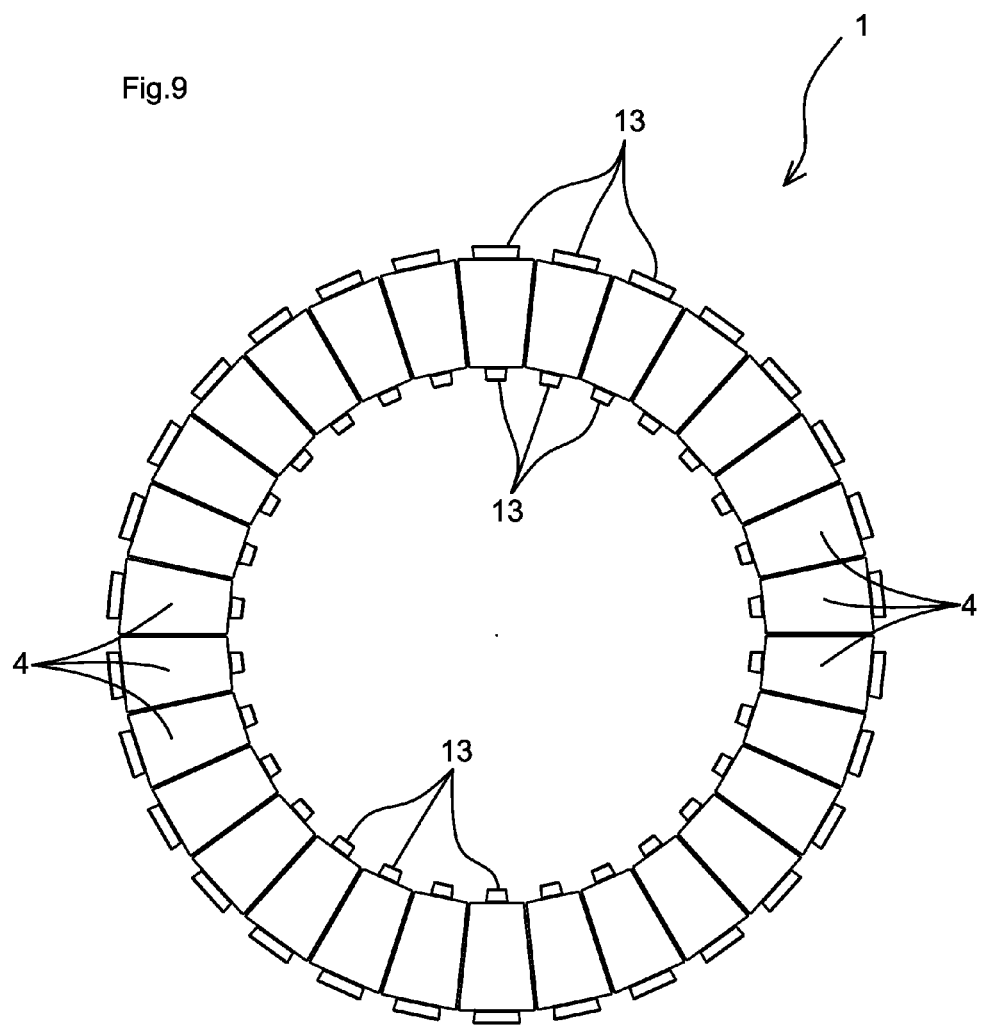
FIG. 9 shows the rotor of FIG. 2, in a plan view, according to a variant.

In a different embodiment (shown in FIG. 9), the top wall 4b is laterally spaced apart from the corresponding top walls 4b of the adjacent teeth 4, so as to define a respective gap. In this embodiment, the rotor 1 can comprise, furthermore, at least one fixing ring made of a ferromagnetic material, which is arranged on top of the top walls and is rigidly connected to them so as to establish an electric and magnetic continuity among the teeth, thus obviating the fact that the lateral edges of the top walls of adjacent teeth are not in contact. Preferably, though not exclusively, a fixing ring of the typed described above can be used in an embodiment like the one shown in FIGS. 2-6, wherein, however, not all teeth 4 are provided with the holding surface 12. As a matter of fact, the use of the fixing ring could allow the teeth without a holding surface 12 to be kept in position on the rotor core thanks to the action of the fixing ring, which causes the teeth 4 to be integral to one another.

Figure 10:
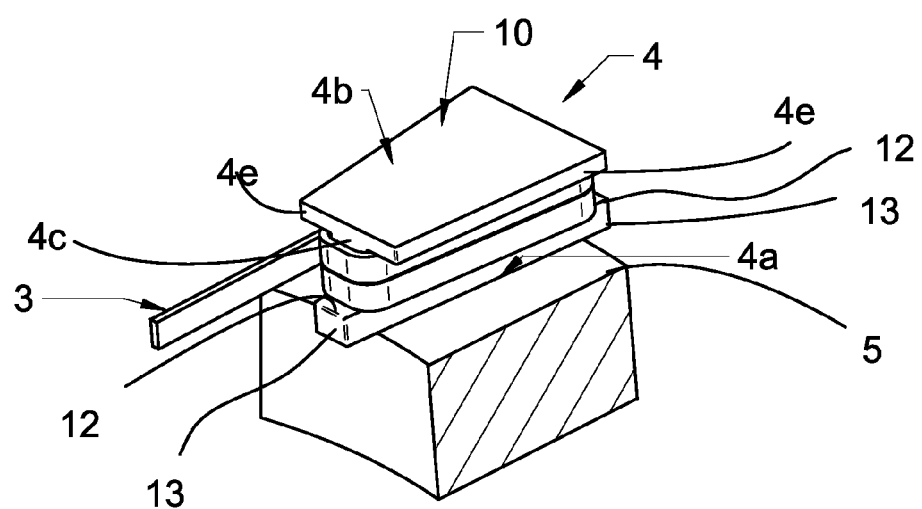
FIG. 10 shows, in a detail in a schematic perspective view, an example of a winding fitted on a tooth, in an embodiment of the invention.

In a different embodiment shown in FIG. 10 (wherein identical reference numbers indicate the same components), the windings 3 are not fitted onto the rotor core 2, but they are fitted onto the teeth 4, in particular onto the stem portion of the tooth 4. In other words, the loops of the winding 3 lie on planes that are parallel to the lying plane of the toroidal rotor core 2 and perpendicular to the axis around which the rotor core 2 develops. In this configuration, the toroidal rotor core 2 can be entire, without having to be divided into the half-rings. Nevertheless, the teeth 4 can be locked on the rotor core 2 in the same way as described above, namely by impregnating the rotor core 2 and the teeth 4 (and, preferably, even the casing) with the resin matrix, which, by sticking to the holding surfaces 12, steadily locks the teeth 4 on the rotor core.

Now, we will describe a method for the production of an axial-flux electric machine M according to the present invention.

The method comprising the steps of: manufacturing a stator section PS; manufacturing a rotor section PR; arranging the rotor section PR and the stator section PS in a predetermined relative position along the rotation axis X of the electric machine M. The step of manufacturing the rotor section PR comprises the step of manufacturing a rotor 1, which, in turn, comprises the sub-steps of:
- providing the rotor core 2 made of a ferromagnetic material, which develops along a circular line In particular, along a segment thereof in case of half-rings 2a, 2b) and has at least one receiving surface 5 lying on the circular line;
- providing a plurality of teeth 4 having the configuration described above and, in particular, at least one holding surface 12;
- providing a plurality of windings 3;
- applying the teeth 4 to the rotor core 2 so that the base wall 4a of each tooth 4 is arranged so as to simply rest on the receiving surface 5, in particular without the use of glueing substances interposed in the interface between the rotor core 2 and the tooth 4;
- applying the windings 3 to the rotor core 2 so that the windings 3 cooperate with the rotor core 2 and with the teeth 4 in order to concatenate with a magnetic flux flowing through the rotor core 2 and the teeth 4;
- impregnating the rotor core 2 and the teeth 4 with a resin matrix, so that the resin, by sticking to the holding surfaces 12, locks each tooth 4 to the rotor core 2.

Preferably, the step of manufacturing the rotor 1 comprises, furthermore, the sub-step of applying the outer casing 11 on the outside of the toroidal rotor core 1 and to the relative windings 3 and teeth 4. The application of the casing 11 allows the relative locking portion to act upon the holding surfaces 12 of the teeth 4, thus keeping the teeth 4 locked on the rotor core 2.

Prior to the sub-step of impregnating with the binding resin matrix, there is provided the sub-step of securing the teeth 4 to the rotor core 2. During this securing step, the assembly made up of the rotor core, the teeth and the casing are inserted into a die (not shown). This die is configured so as to exert a pressure upon the two opposite faces of the rotor (namely, the die presses on the teeth). Furthermore, this die is suited to receive (for example, through injection) an impregnating resin.

In case of application of windings 3 to be fitted onto the rotor core 2 (embodiment of FIGS. 1 to 9), the rotor core 2 is suited to have a configuration divided into two half-rings 2, 3 made of ferromagnetic material, onto which, in each case, the respective windings 3 are subsequently applied and, then, a respective series of teeth 4 is applied.

In order to permit the application of the teeth 4, the windings 3 are arranged in a position that allows them to be equally spaced apart from one another, so as to leave, between one another, suitable portions of the receiving surface 5 uncovered.

After the application of the windings 3 (and, preferably, before the application of the teeth 4), the two half-rings 2a, 2b are joined to one another, so as to obtain the entire toroidal shape of the rotor core 2.

In the solution with the windings 3 fitted on the teeth 4 (FIG. 10), the teeth 4 are applied to the rotor core 2 (in one piece, not necessarily divided into to half-rings) with the windings 3 already fitted on them.

It is possible that, in this step, some teeth are not provided with a winding. This characterises rotors provided with teeth with windings and teeth without windings, which are alternated with one another so as to define a peculiar magnetic circuit.

In an embodiment that is compatible with both solutions described above (windings 3 fitted on the rotor core 2 or windings 3 fitted on the teeth 4), the step of applying the teeth 4 to the rotor core 2 is preceded by the step of mutually connecting at least a sub-set of said teeth 4 (for example, for each half-ring 2a, 2b, all teeth 4 or part of the teeth 4 associated with it) by fixing the top wall 4b of said teeth 4 to the fixing ring made of a ferromagnetic material. Alternatively, the application of the fixing ring to the teeth 4 can take place after the teeth 4 have been arranged on the rotor core 2.

The present invention addresses a rotor 1 having two series of teeth 4 arranged on opposite axial sides. This solution can be used in axial machines M provided with a central rotor 1 and with two stators S, S', which are coaxial to the rotor 1 and are arranged on the two sides of the rotor 1 (see FIG. 1). As already mentioned above, in the stators S, S', the active elements AS, AS' generally are of the type with superficial permanent magnets, facing the rotor. However, the concept of the invention can also be applied to rotors provided with one single series of teeth, namely only on one side. This configuration can be used in motors having one single stator, for example a central stator, which is coupled to two rotors, which are coaxial to it and opposite to one another.

The invention fulfils the object set forth above for the following reasons.

The architecture of the rotor—with teeth that simply rest on the core and with the resin matrix that locks the teeth to the core—allows manufacturers to ensure a high sturdiness and mechanical resistance (for example, against mechanical stresses caused to the teeth by the magnetic interactions with the stator), granting, at the same time, a reduced reluctance of the resulting magnetic circuit, which is not "contaminated" by the presence of adhesive substances between the rotor core and the teeth.

The invention described may be subject to changes and adjusted in several ways without thereby departing from the inventive scope of protection that characterises it.

Moreover, all the details of the invention may be replaced by technically equivalent elements.

All the materials used as well as the sizes can be chosen based on the needs of the user.

The invention claimed is:
1. An axial-flux electric machine (M) with a winding rotor comprising a stator section (PS) and a rotor section (PR), which both develop around a rotation axis (X) of the electric machine (M), the rotor section (PR) comprising a rotor (1), which, in turn, comprises:

a rotor core (2) with a toroidal shape, which develops around the axis (X) and has at least one receiving surface (5) with an annular shape;

a plurality of teeth (4), which are arranged in contact with said receiving surface (5) and extend away from the receiving surface (5) along said axis (X), each one of said teeth (4) having a first tangential surface (4c) facing the axis (X) and a second tangential surface (4d) opposite to said first tangential surface (4c);

a plurality of windings (3), which are angularly distributed around said axis (X) and cooperate with said rotor core (2) and said teeth (4) so as to concatenate a magnetic flux flowing through the rotor core (2) and the teeth (4), characterised in that at least one of said teeth (4) has, on at least one of said tangential surfaces (4c, 4d), a shaped profile defining at least one holding surface (12), which faces away from the toroidal rotor core (2), and in that said rotor (1) has a resin matrix that binds together said toroidal rotor core (2) and said teeth (4), wherein the resin matrix engages together said holding surface (12) and said toroidal rotor core (2) to lock the tooth (4) on the toroidal rotor core (2).

2. A machine (M) according to claim 1, characterised in that, in said rotor (1), said holding surface (12) is defined by a step (13) of said shaped profile (13) and is substantially parallel to said receiving surface (5) of the toroidal rotor core (2).

3. A machine (M) according to claim 1, wherein said holding surface (12) is defined at least on said first tangential surface (4c) of at least one tooth (4).

4. A machine (M) according to claim 1, wherein said at least one holding surface (12) is defined by each one of said teeth (4).

5. A machine (M) according to claim 1, wherein said holding surface (12) is defined at least on said second tangential surface (4d) of said at least one tooth (4), and wherein the rotor (1) comprises an outer casing (11), which shaped so as to embrace said second tangential surfaces (4d) of the teeth (4) and has at least one locking portion, which can be engaged with said holding surface (12) so as to keep the tooth (4) pressed against said toroidal rotor core (2).

6. A machine (M) according to claim 5, wherein said at least one holding surface (12) is defined by each one of said teeth (4), and wherein the locking portion of the casing (11) extends in a circumferential manner along an entire angular length developing around the axis (X) and can be engaged with said holding surfaces (12) of the teeth (4) so as to keep the teeth (4) pressed against said toroidal rotor core (2).

7. A machine (M) according to claim 1, wherein said teeth (4) are angularly distributed around said axis (X) so as to define, between two successive teeth (4), a respective slot (14), and wherein each one of said windings (3) is at least partially housed inside one of said slots (14) and fitted onto the toroidal rotor core (2).

8. A machine (M) according to claim 1, wherein each one of said windings (3) is fitted onto a respective tooth (4).

9. A machine (M) according to claim 1, wherein each tooth (4) has, furthermore, a base wall (4a) resting on the receiving surface (5) of the toroidal rotor core (2) and a top wall (4b) opposite to said base wall (4a), wherein said top wall (4b) has an outer flat surface (10), which is parallel to said receiving surface (5) of the toroidal rotor core (2) and laterally abuts on the corresponding top walls (4b) of the adjacent teeth (4).

10. A machine (M) according to claim 1, wherein each tooth (4) has, furthermore, a base wall (4a) resting on the receiving surface (5) of the toroidal rotor core (2) and a top wall (4b) opposite to said base wall (4a), wherein said top wall (4b) as an outer flat surface (10), which is parallel to said receiving surface (5) of the toroidal rotor core (2) and is laterally spaced apart from the corresponding top walls (4b) of the adjacent teeth (4), so to as to define a respective gap, said rotor (1) comprising, furthermore, at least one fixing ring made of a ferromagnetic material, which is rigidly connected to the top walls (4b) of the teeth (4) so as to establish an electric and magnetic continuity among the teeth (4).

11. A machine (M) according to claim 1, wherein said toroidal rotor core (2) has a first and a second receiving surfaces (5) with an annular shape, which are opposite to one another and substantially perpendicular to said axis (X), and wherein said plurality of teeth (4) are divided into a first series of teeth (4) applied to said first receiving surface (5) and extending away from the first receiving surface (5) along said axis (X) and a second series of teeth (4) applied to said second receiving surface (5) and extending away from the second receiving surface (5) along said axis (X), at least one tooth (4) of each series having said holding surface (12).

12. A method to produce an axial-flux electric machine (M) comprising the following steps: manufacturing a stator section (PS); manufacturing a rotor section (PR); arranging the rotor section (PR) and the stator section (PS) in a predetermined relative position along a rotation axis (X) of the electric machine (M); the step of manufacturing the rotor section (PR) comprising the step of manufacturing a rotor (1), which, in turn, comprises the sub-steps of:

providing a rotor core (2) made of a ferromagnetic material, which develops around a circular line and has at least one receiving surface (5) lying on said circular line;

providing a plurality of teeth (4) made of a ferromagnetic material, each tooth (4) having a base wall (4a), which can be engaged with said receiving surface (5), a top wall (4b), which is opposite to the base wall (4a), and at least two tangential walls (4c, 4d), which are opposite to one another and are delimited by said base wall (4a) and top wall (4b), and wherein at least one of said teeth (4) has, on at least one of said tangential surfaces (4c, 4d), a shaped profile defining at least one holding surface (12) facing away from the base wall (4a);

providing a plurality of windings (3);

applying the teeth (4) to the rotor core (2) so that the base wall (4a) of each tooth (4) is arranged so as to simply rest on said receiving surface (5);

applying the windings (3) to the rotor core (2) so that the windings (3) cooperate with the rotor core (2) and with the teeth (4) in order to concatenate with a magnetic flux flowing through the rotor core (2) and the teeth (4);

after the teeth (4) have been applied to the rotor core (2), impregnating the rotor core (2) and the teeth (4) with a resin matrix, so that the resin sticks to the holding surface (12), thus locking the teeth (4) to the rotor core (2).

13. A method according to claim 12, wherein between the sub-step of applying the teeth (4) to the rotor core (2) and the sub-step of impregnating the rotor core (2) and the teeth (4) with a resin matrix there is interposed the sub-step of securing the teeth (4) to the rotor core (2) by inserting the rotor core (2) and the teeth (4) applied thereto into a die.

14. A method according to claim 12, wherein the sub-step of providing a rotor core (2) made of a ferromagnetic material is performed by providing two half-rings (2a, 2b) made of a ferromagnetic material, and wherein said sub-step of applying the windings (3) to the rotor core (2) is performed by fitting said windings (2) onto the respective half-ring (2a, 2b), said sub-step of applying the windings (3) to the rotor core (2) is performed before the step of applying the teeth (4) to the half-rings (2a, 2b); said method comprising, furthermore, the sub-step of joining said half-rings (2a, 2b) so as to obtain the entire toroidal rotor core (2).

15. A method according to claim 12, wherein the sub-step of providing a rotor core (2) is performed by providing a single rotor core (2) with a toroidal shape made of a ferromagnetic material, and wherein the sub-steps of applying the teeth (4) to the rotor core (2) and applying the windings (3) to the rotor core (2) are performed by fitting each winding (3) onto a respective tooth (4) and by subsequently applying the tooth (4) to the rotor core (2) by laying the base wall (4a) of the tooth (4) onto the receiving surface (5) of the rotor core (2).

16. A method according to claim 12, wherein the sub-step of applying the teeth (4) to the rotor core (2) is preceded by the sub-step of mutually connecting at least a sub-set of said teeth (4) by fixing the top wall (4b) of said teeth (4) to a fixing ring made of a ferromagnetic material.

17. A method according to claim 12, wherein the step of manufacturing the rotor (1) comprises the sub-step of coupling a casing (11) with an annular shape to the outside of the toroidal rotor core (2), the teeth (4) and the windings (3), said casing (11) having at least one locking portion, which can be engaged with said holding surface (12) of said at least one tooth (4) so as to keep the tooth (4) pressed against said toroidal rotor core (2).

* * * * *